United States Patent [19]

Mendelson

[11] Patent Number: 4,590,381

[45] Date of Patent: May 20, 1986

[54] PHOSPHORESCENT MARKING SYSTEM

[75] Inventor: Max Mendelson, Toronto, Canada

[73] Assignee: Pineapple Industries, Inc., Canada

[21] Appl. No.: 744,269

[22] Filed: Jun. 13, 1985

[51] Int. Cl.[4] ..................... H05B 33/00; H05B 33/10; G01J 1/58; G01N 21/64

[52] U.S. Cl. .............................. 250/484.1; 250/485.1; 430/139

[58] Field of Search ............... 250/489.1, 485.1, 487.1; 430/139

[56] References Cited

U.S. PATENT DOCUMENTS

| | | | |
|---|---|---|---|
| 3,205,071 | 9/1965 | Finnis | 430/139 |
| 3,631,243 | 12/1971 | Byler et al. | 250/485.1 |
| 3,725,694 | 4/1973 | D'Amato et al. | 250/485.1 |
| 4,179,614 | 12/1979 | Felice et al. | 250/484.1 |
| 4,220,852 | 9/1980 | Seidel | 250/484.1 |

*Primary Examiner*—John E. Kittle

*Assistant Examiner*—Mukund J. Shah

*Attorney, Agent, or Firm*—Finnegan, Henderson, Farabow, Garrett & Dunner

[57] ABSTRACT

A device of phosphorescent material on which luminescent images are formed and retained for a period of time is disclosed. The device includes phosphorescent material in the form of a sheet mounted on a support. The support exposes the top surface of the phosphorescent material to activating light. A shield maintains deactivation of the phosphorescent material. Upon removal of the shield in a dark area, the phosphorescent material may be activated in selected areas to form an image which is retained for a period of time until the phosphorescent material has decayed to an inactivated state of imperceptible level of luminescence. This type of device is particularly suited to amusement and educational items for children. However, it is also useful in industrial applications where writing and communication of information in the dark is necessary.

16 Claims, 10 Drawing Figures

FIG.8.
FIG.9.
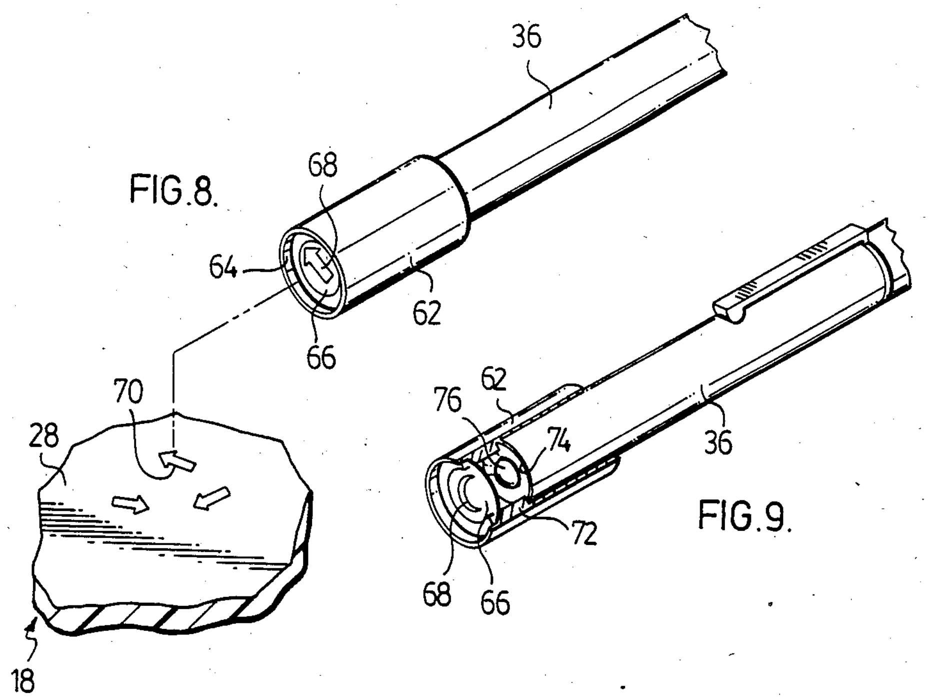
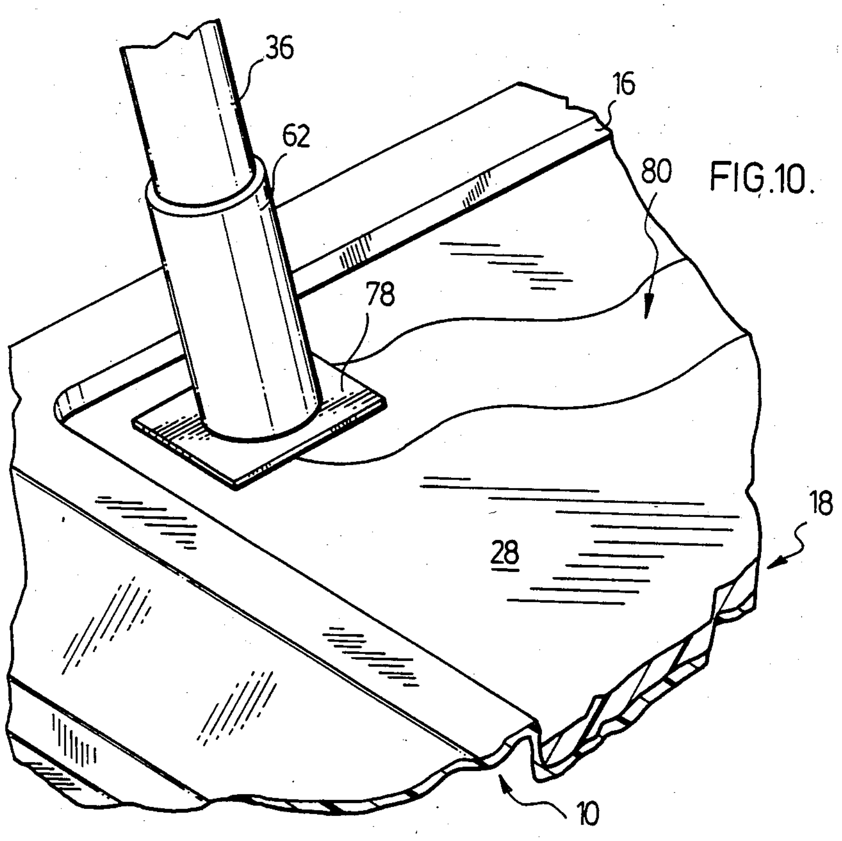
FIG.10.

PHOSPHORESCENT MARKING SYSTEM

FIELD OF THE INVENTION

This invention relates to a device or phosphorescent material on which luminescent images can be formed and retained for a period of time.

BACKGROUND OF THE INVENTION

Phosphorescent materials have been used in a variety of commercial applications because they have the property of continuing to emit light for an extended period of time after excitation. Phosphorescent pigments have, therefore, been used in warning signs; marking of vital machinery; dial illumination; directional signs on walls of underground stations, garages, hallways; and applied to helmets as used in fire departments, accident prevention, etc. Phosphorescent pigments have also found application for use on protective clothing, sports equipment and a variety of toys where the effect of glowing in the dark provides amusement, ornamental and/or safety features. Phosphorescent materials include a phosphor which has been artificially prepared and has the property of lumincescence when activated by appropriate wavelengths of light. Phosphors may be selected from the group of zinc sulfide, zinc cadmium sulfide, alkaline earth sulfides with or without a trace of activators, such as silver, copper or manganese. The phosphorescent pigments may be incorporated into a variety of carriers so that the phosphorescent material may be used in many ways such as forming heat transfers to fabric surfaces for purposes of ornamentation, such as disclosed in U.S. Pat. No. 4,089,722. Such luminescent materials have also been used to aid in the writing and reading in the dark, such as disclosed in U.S. Pat. Nos. 2,632,116, 2,883,770, 3,832,556 and 3,978,340. These systems all contemplate in one manner or another the activation of the phosphorescent material to provide illumination of the material on which normal writing by pencil or pen is achieved.

U.S. Pat. No. 2,516,727 discloses the use of phosphorescent material, selected areas of which are exposed to activating light. By the use of various shaped figures positioned on the phosphorescent material, silhouette or shadows remain which are not illuminated. However, this patent does not contemplate any form of device which ensures that the phosphorescent material is deactivated before the desired images are formed, thus rendering it useless for transport of the light chargeable pad in illuminated areas and subsequent immediate use in dark areas.

SUMMARY OF THE INVENTION

The invention relates to a device having phosphorescent material on which luminescent images are formed and retained for a period of time. The device comprises means for supporting the phosphorescent material. The phosphorescent material comprises a uniform distribution of a phosphor in a carrier. The support means permanently shields a bottom surface of the phosphorescent material from phosphor activating light. The support means exposes a top surface of the phosphorescent material to phosphor activating light. According to an aspect of the invention, an improvement comprises means for shielding the top surface of the phosphorescent material from phosphor activating light. The shield means is positionable over the top surface to maintain the phosphorescent material in a deactivated state and subsequently, removable from the top surface to expose the top surface to phosphor activating light. A source of light and means for controlling exposure of selected portions of said phosphorescent material to the source of light are provided to form an image on the inactivated phosphorescent material when the shield is removed. The image is retained for a period of time until activation of the phosphor has decayed to an inactivated state of an imperceptible level of luminsecence.

According to another aspect of the invention, a method of forming a luminescent image in this type of phosphorescent material comprises the improvement of shielding the phosphorescent material from phosphor activating light with a shield to maintain the material in a deactivated state. The shield is removed in a dark location and phosphor activating light is directed onto the deactivated material. The activating light is controlled to activate only selected portions of the material to form the luminescent image.

BRIEF DESCRIPTION OF THE DRAWINGS

Preferred embodiments of the invention are shown in the drawings wherein:

FIG. 8 is a perspective view of an end portion of a light source projecting a beam of particular shape;

FIG. 9 is a perspective view with an end portion cut away showing the construction of a template for modifying the focused beam of light from the light source; and FIG. 10 is a perspective view of a section of the device of FIG. 1 having the phosphorescent material fully activated and then selectively deactivating portions of the phosphorescent material with deactivating radiation.

DETAILED DESCRIPTION OF THE PREFERRED EMBODIMENTS

Figure 1:
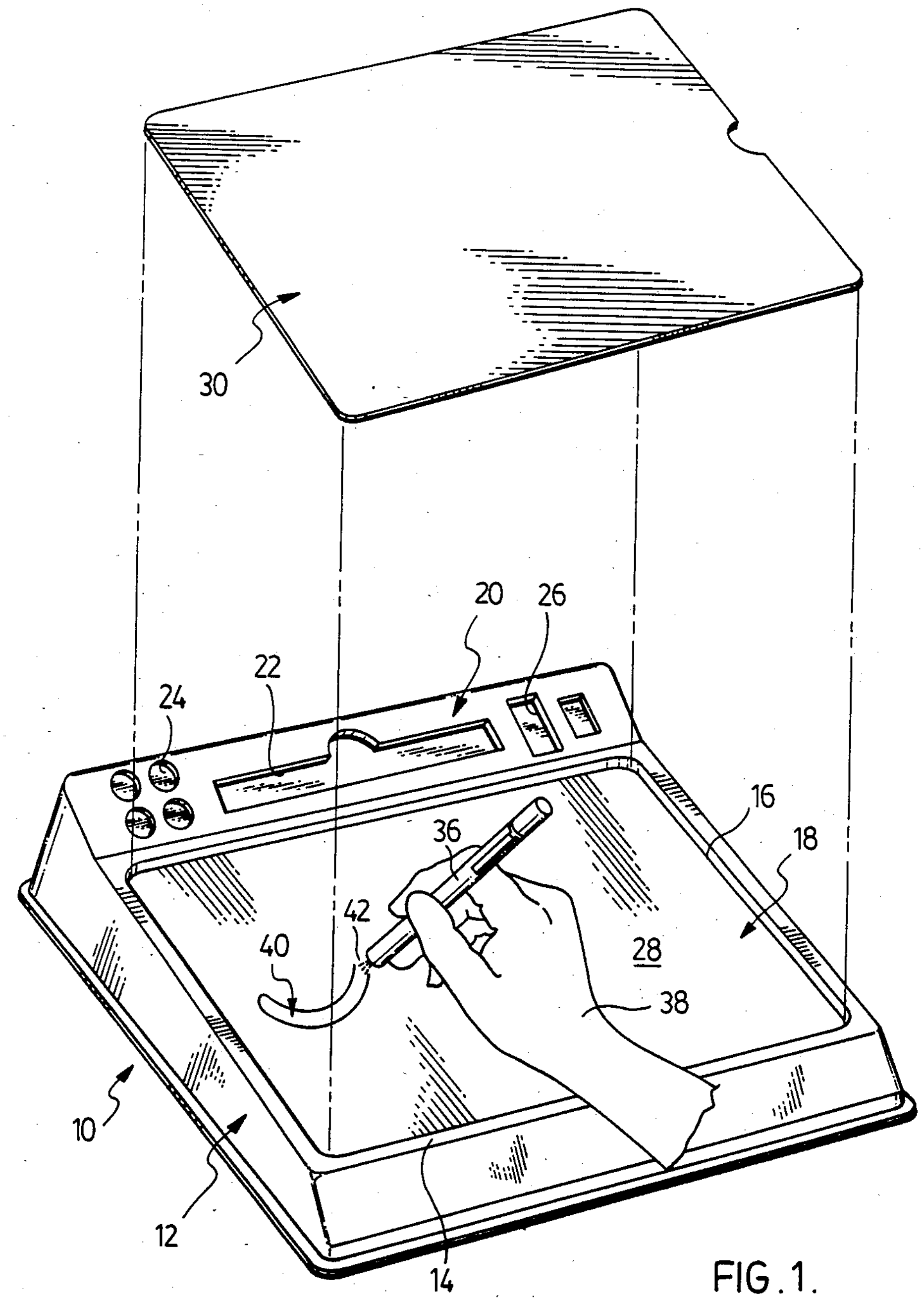
FIG. 1 is a perspective view of a device having a layer of phosphorescent material on which images can be formed in the dark.
Figure 2:
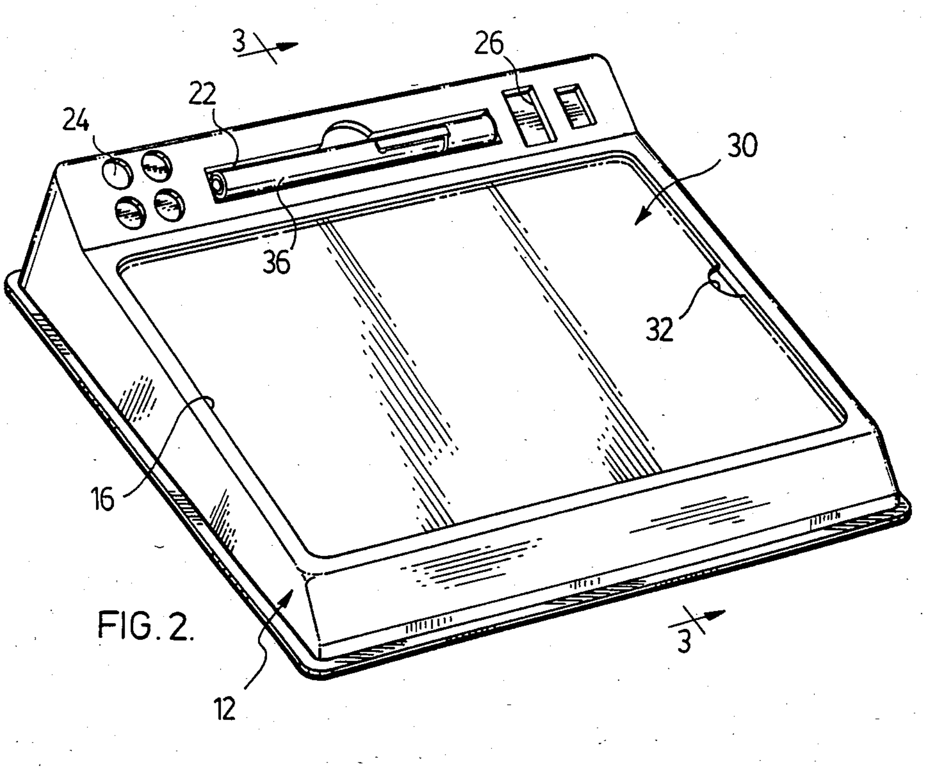
FIG. 2 is a perspective view of the device of FIG. 1 having the shield in position.

The phosphorescent imaging device, according to this invention, may be used in a variety of ways to provide amusement, novelty and education items for children and adults. The device 10, as shown in FIG. 1, provides a type of educational and amusement device where any desired image or predetermined image may be developed on the phosphorescent material of the device. The device comprises a support base 12 with a top surface 14 and depending side walls 16 to define a recess in the base 12. Mounted within the recess is the phosphorescent material 18 which, according to this embodiment, is in the form of a sheet. Elevated to the rear of the base 12 is a panel 20 having a plurality of recesses 22, 24 and 26 formed therein to receive various types of image forming devices and light sources. The sheet of phosphorescent material 18 has its top surface 28 exposed with the shield 30 removed from the top surface 28. As shown in FIG. 2, the shield 30 is normally positioned within the recess defined by perimeter walls 16 of the base 12 to guide and locate the positioning of the shield 30 over the phosphorescent material top surface 28 to shield the material from phosphor activating light. A recess 32 is provided in the shield 30 to facilitate removal of the shield from the base 12.

Figure 3:
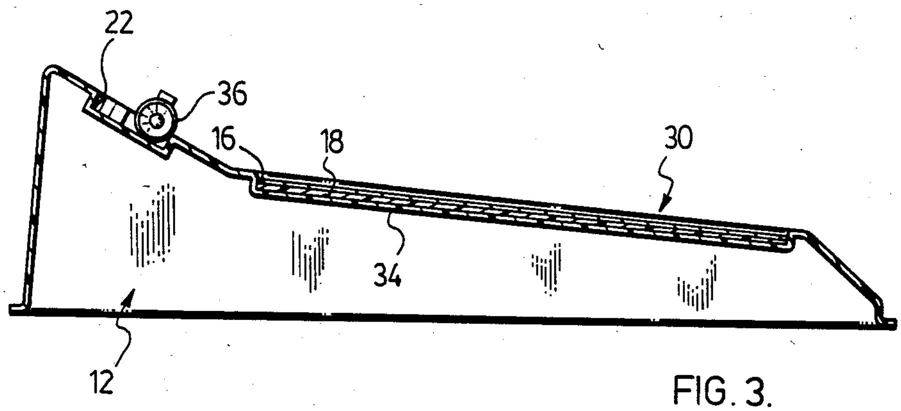
FIG. 3 is a section along the lines 3—3 of FIG. 2.

As shown in the section of FIG. 3, the base 12 includes an underside 34 of rigid material which supports the sheet 18 of phosphorescent material. The sheet 18, as received within the recess defined by depending walls 16, may be adhesively secured to the base support 34. The base support 34 is formed of a material which is opaque to phosphor activating light to ensure that when the shield 30 is in place on top of the phosphorescent material 18, there can be no activation of the phosphorescent material.

When it is desired to form a luminescent image on the phosphorescent material 18 of the device 10, the protective shield 30 may be removed when the device is in a dark room or dark area. A source of light, such as pen light 36 and which is portable, may be manually moved across the phosphorescent material upper surface 28 by a person's hand 38. Depending upon the direction in which the pen light 36 is moved across the surface, an image of a desired shape may be formed such as the commencement of an image schematically shown at 40. The pen light 36 has a focused beam 42 of sufficient intensity to activate the phosphor in the phosphorescent material during slow movements of the pen light by the hand. The activation of the phosphor is sufficient to ensure that the image formed by the pen light continues to glow after the activating light of the panel light is removed for a time sufficient to provide the necessary amusement or educational purpose for the device 10.

The image schematically shown at 40 is of a width essentially the same as the diameter of the pen light. It is appreciated that varying widths of light beams may be used to create the desired effect with the luminescent image. The light beam of the pen light 36 may be narrowed considerably from that represented by image 40. This may be accomplished by devices placed on the end of the pen light 36 in the manner to be discussed with respect to FIGS. 8 and 9. It has been found that by the use of narrow light beams, there is less distinction in illumination of old or new images generated by the pen light.

Varying concentrations of phosphor in the phosphorescent material 18 may be used to achieve the desired period of luminescence after activation to serve the particular purpose of the device. For example, in industrial applications where the device is used for purposes of conveying written messages in the dark, it may be necessary to retain the message for several hours, whereas when the device is used as an amusement device or educational device for children, where the screen 28 of the phosphorescent material may become filled quickly with various images, a rapid decay in the luminescence of the phosphor is desired. It has been found that by varying the concentration of the phosphor in the phosphorescent material in the range from approximately 5% by weight up to 30% by weight, an acceptable range of periods during which the material continues to glow after activation is achieved.

A variety of phosphors are available for use in providing luminescence when activated by an appropriate source of light. Commercially available phosphors include zinc sulfide, zinc cadmium sulfide, and alkaline earth sulfides. These compositions may include a trace of activator such as silver, copper or manganese to provide the desired rapid activation of the phosphorescent material in providing the luminescent image. The phosphors, which are used as phosphorescent pigments in a carrier to form the phosphorescent material sheet 18, can be incorporated with a variety of carriers. Commercially available sheets of phosphorescent material include the admixture of phosphorescent pigment with clear polyvinylchloride which is extruded in sheet form. The concentration of the phosphorescent pigment is essentially uniform across at least the upper surface 28 of the sheet 18. This ensures an even degree of illumination across the surface of the activated phosphorescent material.

The shield 30 is used to ensure that the phosphorescent material 18 remains in a deactivated state or in the event that it has been activated, ensures that over time during decay in the excitation of the phosphors, the material resumes a deactivated state and is maintained at that level. The shield 30 may be constructed of materials which are opaque to any wavelength of light or at least filters or blocks out the wavelengths of light which activate the phosphors. Furthermore, the shield prevents "graying" of the surface 28 of the phosphorescent material. "Graying" can occur should the phosphorescent pigments of the material be exposed to direct ultraviolet light and high humidity conditions for a long period of time. This is particularly applicable with zinc sulfides and zinc cadmium sulfides.

In some situations, an intense luminescent image is desired which may require high concentrations of phosphor in the phosphorescent material in the range of 20 to 30%. This can result in the luminescent image remaining for a considerable length of time before the image decays to a level of luminescence which is imperceptible to the human eye in normal dark environments. It has been found that exposing the phosphorescent material to electromagnetic radiation having a wavelength in the range of infrared to red light causes a very rapid deactivation of the phosphorescent material to return substantially to a deactivated state and permit immediate reuse of the device.

Figure 4:
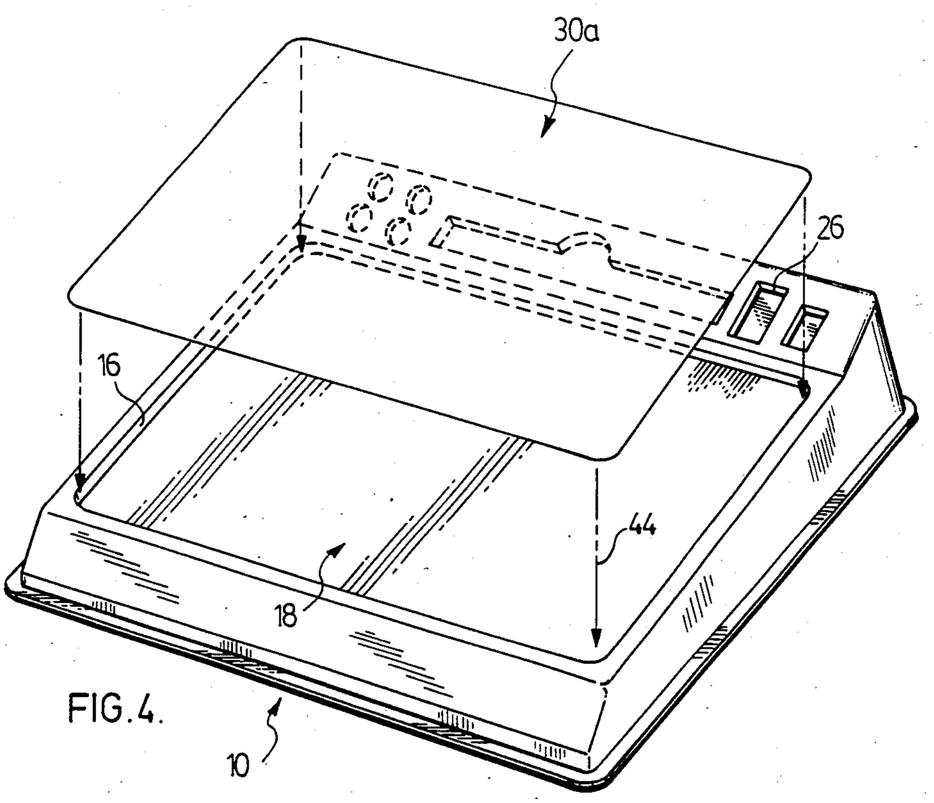
FIG. 4 is a perspective view of the device of FIG. 1 showing the use of a deactivation shield for the phosphorescent material.
Figure 5:
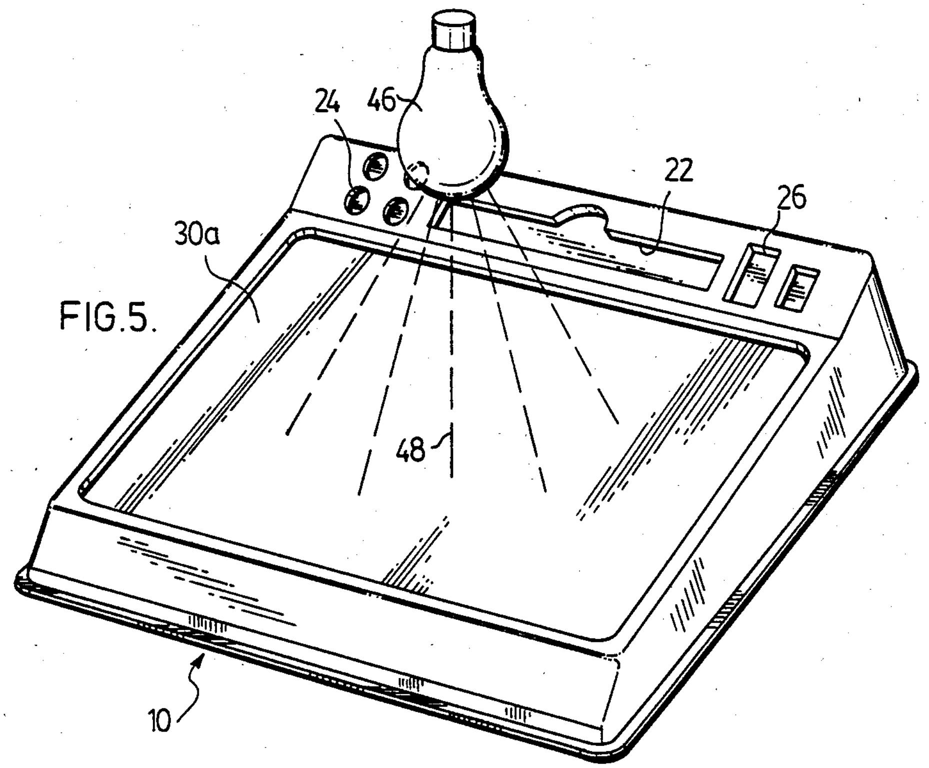
FIG. 5 is a perspective view of the device of FIG. 4 showing the use of certain wavelengths of light to deactivate the phosphorescent material.

As shown in FIGS. 4 and 5, deactivation of the phosphorescent material may be accomplished by placing a special type of shield 30*a* on the device 10 as lowered into the recessed area defined by depending side walls 16. The special shield 30*a* is formed of a material and colored to act as a filter to pass only radiation having a wavelength in the range of infrared to red and filters out most of the remaining wavelengths of the visible light spectrum of electromagnetic radiation.

With the shield 30*a* in place on the device 10 as lowered in the direction of arrows 44, the shield 30*a* is exposed to a normal incadescent source of light depicted by the light bulb 46. The light energy 48 from the bulb is directed onto the shield filter 30*a* to pass only the red and near infrared wavelengths of light. This results in an erasure of the image or images formed in the activated phosphorescent material 18 such that when the shield 30*a* is removed in the direction of arrow 50 of FIG. 6, the phosphorescent material 18 is in an essentially deactivated state to permit immediate reuse of the device 10 for purposes of forming new images or messages depicted by images 52 on the device 10.

It is appreciated that a variety of other devices may be used to effect rapid deactivation of activated phosphorescent material. For example if available, a source of infrared or red light may be used directly on the phosphorescent material to deactivate same and then a shield such as 30 formed of cardboard or opaque plastic may be placed over the deactivated phosphorescent material 18. Instead of an opaque or cardboard shield 30, the filter 30*a* may constitute a shield because in it only passing light energy in the range of infrared to red, it does not activate the phosphor of the phosphorescent material, thus retaining the phosphorescent material in a deactivated state.

Figure 6:
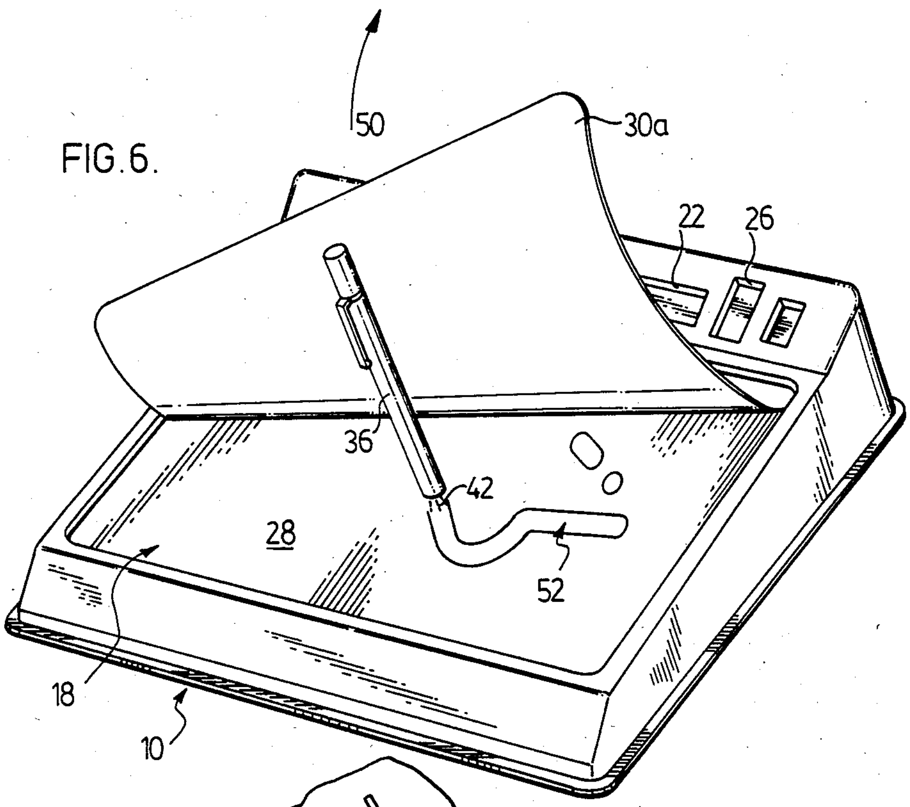
FIG. 6 is a perspective view of the device of FIG. 5 showing the removal of the deactivation shield to permit formation of new images.
Figure 7:
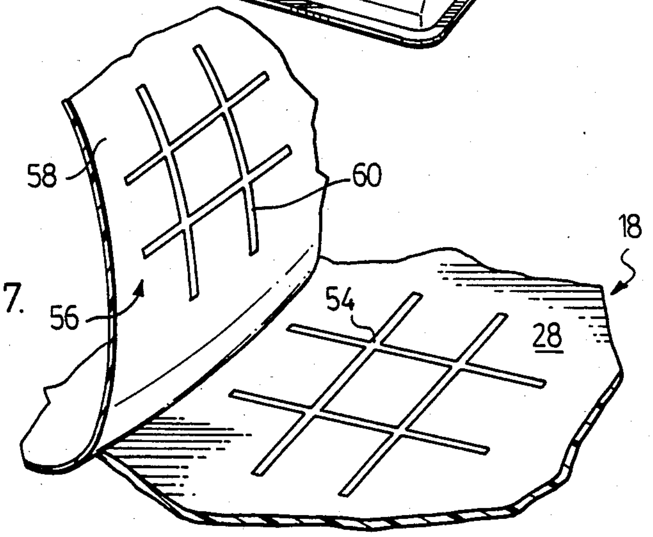
FIG. 7 is a section of a template used in forming a desired image on the phosphorescent material.

Aside from manually creating desired images, messages and the like on the phosphorescent material 18, in the manner shown in FIGS. 1 and 6, predetermined images may be formed on the phosphorescent material. With reference to FIG. 7, the phosphorescent material 18 has formed therein a luminescent image in the form of a grid pattern 54 as achieved by activation of the phosphor material in the top surface 28. To accomplish formation of a predetermined shape for an image such as 54, a template 56 is used having portions or areas 58 which are opaque to the phosphor activating light directed onto the device 10. The opaque portions surround and are adjacent to transparent portions 60 of the template 56 through which deactivating light passes and which in turn defines the shape of the predetermined grid 54 as defined by the activated phosphorescent material 18. It is appreciated that in addition to the opaque and transparent portions 58 and 60 of the template 56, additional areas of the template 56 may be of translucent material which has varying degrees of transparency to the wavelengths of the phosphor activating light. This results in the production of an image on the phosphorescent material 18 which has varying degrees of luminescence and, therefore, a shading effect. A particular example of this embodiment of the invention is the use of a positive or negative transparency of an image such as a photographic plate which, when placed between a source of activating light and the phosphorescent material or placed directly on top of the phosphorescent material, an image is formed with shading resembling the image on the photographic plate.

The template 56 may be designed to resemble the shape of shield 30 and thereby cover the entire upper surface 28 of the phosphorescent material exposed to activating light to form an image or images across the entire surface. Templates may also be used to directly modify the shape of the beam of activating light. With reference to FIG. 8, the pen light 36 has an adaptor 62 slidably received on the end of the pen light 36. The open end 64 of the adaptor has secured therein a template or mask 66 having a transparent portion 68 in the shape of an arrow surround by opaque material. The beam of light emerging from the pen light 36 is, therefore, modified to project a beam in the shape of the arrow such that when the device 62 is placed on top 28 of the phosphorescent material 18, an image 70 is formed which corresponds in shape with that of the transparent portion 68.

As shown in more detail in FIG. 9, the adaptor 62 has internally thereof a stop portion 72 which abuts the lower end 74 of the pen light. The stop 72 spaces the mask 66 a predetermined distance from the lens 76 which focuses the light emitted by the bulb to form a beam of essentially parallel rays. As per FIG. 9, a different shape for the transparent portion 68 is provided. The crescent shape 68 can, therefore, be formed as a corresponding image on the surface 28 of the luminescent material 18.

It is appreciated that the template of FIGS. 8 or 9 may be used to define a narrow slit or pin point opening. This adaptation provides a corresponding narrow beam which is used to generate narrow line images of the type previously discussed. Devices other than this type of mask or template may be used to generate narrow line images, for example, a lens which focuses the light beam to a narrow beam or dot when held at the appropriate distance from the phosphorescent material top surface 28.

According to a further embodiment of the invention, the discovery that infrared and/or red light causes a rapid deactivation of the phosphorescent material can be used to form an image in contrast to the activated regions of the phosphorescent material. With reference to FIG. 10, the phosphorescent material has its upper surface entirely activated. The pen light 36 in emitting the entire visible light spectrum has a template 78 secured to adaptor 62 which only transmits the infrared to red region of the emitted spectrum. Thus, by moving the pen light 36 across the upper surface 28, the portions of the phosphorescent material which are exposed to the red and infrared light is deactivated to form the image 80 of deactivated area surrounded by activated portions of the phosphorescent material 18. In this manner, the shape of an existing image may be modified by use of red or infrared radiation, or an entirely new image may be developed on the phosphorescent material provided by a contrast in deactivated to activated areas or regions of the phosphorescent material.

From the above discussion of the preferred embodiments of the invention, it becomes apparent that the device may be used in a variety of ways to provide educational and amusement such as in children's toys and educational devices. By use of a variety of adaptors mounted on the pen light 36 where the adaptors may be stored in the compartments 24 and 26, a variety of predetermined images may be formed on the upper surface 28 of the phosphorescent material. Furthermore a variety of predetermined images may be provided by templates which are used over the entire surface of the device, for example, the grid pattern 54 as shown in FIG. 7 which permits the playing of various types of games in the dark. The shield material 30*a*, which transmits the red to infrared region of the spectrum, provides for rapid deactivation of the material so that the device can be immediately reused to provide continued amusement or educational instruction.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. In a device of phosphorescent material on which lumincescent images are formed and retained for a period of time, said device comprising means for supporting said phosphorescent material, said phosphorescent material including a uniform distribution of a phosphor in a carrier, said support means permanently shielding a bottom surface of said phosphorescent material from phosphor activating light, said support means exposing a top surface of said phosphorescent material to phosphor activating light, the improvement comprising means for shielding said phosphorescent material top surface from phosphor activating light, said shield means being positionable over said top surface to maintain said phosphorescent material in a deactivated state and subsequently removable from said top surface to expose said top surface to phosphor activating light, a source of light and means for controlling exposure of selected portions of said phosphorescent material to said source of light to form an image on said inactivated phosphorescent material when said shield is removed, said image being retained for said period of time until activation of said phosphor has decayed to an inactivated state of an imperceptible level of luminescence.

2. A device of claim 1, wherein said shield means is a removable sheet of flexible material which is opaque to phosphor activating light.

3. A device of claim 2, wherein said support means has a perimeter wall raised above said phosphorescent material, said sheet having an outline corresponding in shape to said perimeter wall, said perimeter wall thereby guiding placement of and locating said sheet over said phosphorescent material.

4. A device of claim 3, wherein said phosphorescent material is in sheet form which is mounted on said support means.

5. A device of claim 4, wherein said carrier is a clear plastic inert to said phosphor.

6. A device of claim 1, wherein said source of light is a portable light, said means for controlling exposure of said light source comprising means for focusing light onto a limited portion of said phosphorescent material whereby movement of said portable light permits formation of a desired image.

7. A device of claim 1, wherein said source of light is a portable light, said means for controlling exposure of said light source comprising a template having a design defined by areas which are opaque and transparent to said phosphor activating light, an image being formed by activating light passing through said transparent areas of said template.

8. A device of claim 7, wherein said template is mounted on said portable light source.

9. A device of claim 8, wherein said portable light source comprises means for focusing activating light from said source onto a beam of light, said transparent area of said template being shaped to pass only a portion of such beam of light to form an image on said phosphorescent material.

10. A device of claim 7, wherein said template has translucent areas in combination with said opaque and transparent areas, said translucent areas having varying degrees of transparency to said phosphor activating light to provide an image having shading.

11. A device of claim 1, wherein said phosphor is selected from the group consisting of zinc sulfide, zinc cadmium sulfide and alkaline earth sulfides.

12. A device of claim 11, wherein said carrier is clear polyvinyl chloride which is extruded into a sheet.

13. A device of claim 1, wherein said shield means is adapted to rapidly deactivate said phosphorescent material when activated, said shield means comprises means for directing radiation with a wavelength in the range of infrared to red onto said actuated material.

14. A device of claim 13, wherein said shield means comprises a light filter which is transparent to light of infrared to red wavelength.

15. A device of claim 14 wherein said light filter is a red plastic sheet.

16. A device of claim 13 wherein said light source is adapted to direct red light onto actuated portions of said phosphorescent material to deactivate selected areas and thereby alter an existing image or form an image.

* * * * *